United States Patent

[11] 3,582,020

| | | |
|---|---|---|
| [72] | Inventor | Edwin H. Wrench<br>La Jolla, Calif. |
| [21] | Appl. No. | 881,178 |
| [22] | Filed | Dec. 1, 1969 |
| [45] | Patented | June 1, 1971 |
| [73] | Assignee | General Dynamics Corporation<br>San Diego, Calif. |

[54] GRAVITY GRADIENT SATELLITE ORIENTATION SYSTEM FOR HIGH POINTING ACCURACY
15 Claims, 6 Drawing Figs.

[52] U.S. Cl. .................................................. 244/1SA, 343/705
[51] Int. Cl. .................................................... B64g 1/10
[50] Field of Search ............................................ 244/155, 155 A; 343/705, 705 S

[56] References Cited
UNITED STATES PATENTS
3,241,142  3/1966  Raabe .......................... 343/100
3,532,298  10/1970  Swet............................ 244/1

Primary Examiner—Milton Buchler
Assistant Examiner—Jeffrey L. Forman
Attorneys—Neil F. Martin and Carl R. Brown ABSTRACT: A gravity gradient satellite orientation system in which tip weights that may be satellite halves, are held in spaced separation by a flexible cable under tension of a resilient means that biases the tip weights apart, which system preserves the stiffness of the dumbbell configuration against magnetic torque and thermal distortions to reduce error in pointing accuracy because of tip deflections in the dumbbell configuration.

Fig. 1

PATENTED JUN 1 1971 3,582,020

INVENTOR.
EDWIN H. WRENCH

BY

*Carl R. Brown*

ATTORNEY

INVENTOR.
EDWIN H. WRENCH

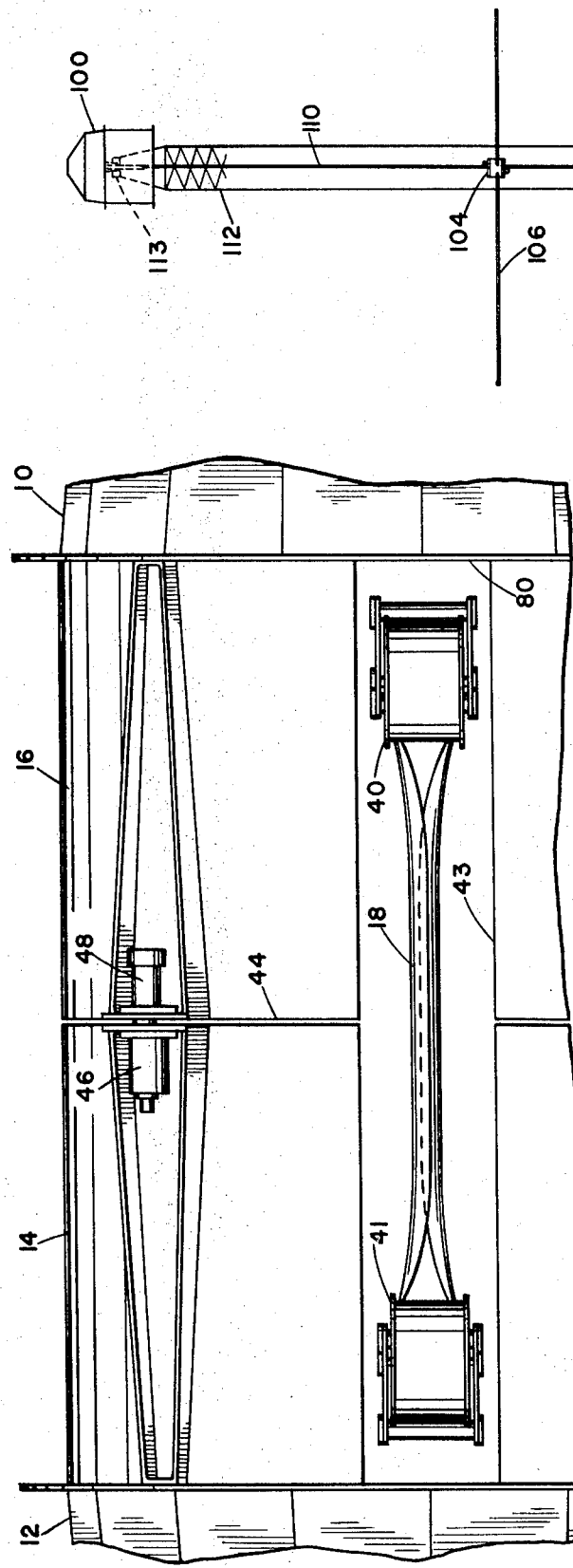
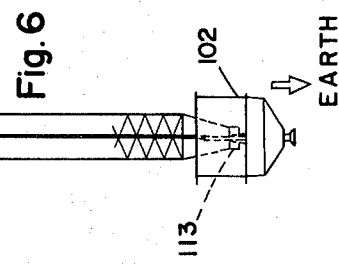
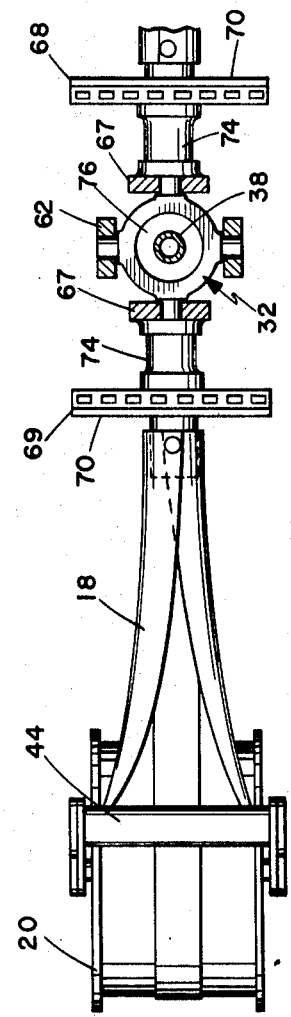
INVENTOR.
EDWIN H. WRENCH
BY
Carl R. Brown
ATTORNEY

GRAVITY GRADIENT SATELLITE ORIENTATION SYSTEM FOR HIGH POINTING ACCURACY

BACKGROUND OF THE INVENTION

The pointing accuracy of gravity gradient satellite orientation systems, is of critical importance particularly at high altitudes. However the pointing accuracy of known gravity gradient systems is limited by factors effecting pointing accuracy, such as, magnetic and solar pressure torques and steady state, thermally induced boom distortions. These resulting distortions bend the boom into an arc that shifts the centers of pressure and centers of gravity of the satellite unit, and angularly deflects the boom tips from the principle inertia axis. This causes the antenna of the satellite to point at an angle from vertical orientation relative to, for example, the earth. To improve pointing accuracy of satellites stabilized by deployable booms, tip weight configurations and pure dumbbell configurations in which the total payload constitutes the tip masses, have been developed. However, it has been found that tip weight orientation systems and dumbbell configurations are similarly effected by thermal distortion and other factors in space that angularly deflect the tips of the dumbbell or tip arrangements and thereby deflect the pointing accuracy of the gravity gradient orientation system and the antenna employed on the satellite.

Therefore it is advantageous to have a new and improved gravity gradient satellite orientation system that is capable of resisting factors effecting pointing accuracy in space.

SUMMARY OF THE INVENTION

In an embodiment of this invention, a flexible cable functions as the primary boom in a gravity gradient system of, for example, the vertistat type. The cable holds two bodies in spaced apart position. The flexible cable is held in tension by a resiliently biasing deployable hoop, toroid or truss structure. The tip weights, which may consist of two identical halves of the spacecraft, are held apart by the resiliently biasing means and are aligned along the principle axis by tension in the interconnecting cable. The two halves of the payload are thus mounted to the separating structure providing a dumbbell configuration with each of the satellite halves being mounted to the hoop by universal joints or gimbals that provide rotational freedom of satellite halves about at least two axes orothogonal to the line or flexible cable joining the halves. Short rods attached to the spacecraft halves transform the cable tension into torque on the universal joint to position the halves along the prinicple axis. The short rods are attached to a point on the line along the pointing axis and inside the gimbal. Thus tension applied to the cable by the separating hoop or truss maintains the line of site of each payload coaxial with the major inertia axis of the dumbbell configuration.

The use of resilient force in this system allows the structure to be collapsed into a compact size for movement into space, and then to be released for expansion into the end configuration upon command. Further the resilient force exerts constant tension to a flexible cable that maintains the alignment of the dumbbell configuration regardless of the effects of magnetic torque and thermal distortion in space.

The hoop or truss configurations may be stabilized with a conventional damper unit or stabilizing boom unit and electrical connections between the spacecraft halves can be made through the hoop or cable.

Accordingly, the resultant gravity gradient satellite orientation system of this invention is capable of reducing pointing errors to ⅛ to ⅙ of that possible in more conventional designs.

It is therefore an object of this invention to provide a new and improved gravity gradient satellite orientation system for achieving high pointing accuracy at any altitudes in space and particularly at synchronous altitudes.

It is another object of this invention to provide a new and improved gravity gradient satellite orientation system that resists factors affecting pointing accuracy in space including magnetic and solar pressure torques and steady state, thermally induced boom distortions.

It is another object of this invention to provide a new and improved gravity gradient satellite orientation system of the dumbbell type for providing biasing force between the weighted tip masses that resists distortion therebetween that can result in the vertical misalignment with the primary or the earth.

It is another object of this invention to provide a new and improved gravity gradient satellite orientation system of the dumbbell configuration that preserves stiffness of the dumbbell configuration in response to magnetic torques, thermal distortion and the like and which configuration is expandable from a satellite housing.

It is another object of this invention to provide a new and improved gravity gradient satellite orientation system that is expandable from a satellite housing and has a dumbbell configuration that is capable of retaining the mass and pressure distribution of the dumbbell configuration in which the centers of pressure and mass move together during distortion.

It is another object of this invention to provide a new and improved gravity gradient satellite orientation system of the dumbbell configuration that substantially eliminates error produced by tip deflections in dumbbell configurations.

Other objects and many advantages of this invention will become more apparent upon a reading of the following detailed description and an examination of the drawings wherein like reference numerals designate like parts and wherein:

BRIEF DESCRIPTION OF THE DRAWINGS

FIG. 4 is an enlarged sectional view taken on line 4-4 of FIG. 2.

FIG. 5 is a partial plan view as taken from the top of FIG. 2.

FIG. 6 is a view of an alternative deployed configuration of the satellite, using a truss-type support.

Referring to FIG. 1, there is illustrated an embodiment of the invention with a satellite deployed in space having the improved gravity gradient satellite orientation system for achieving high pointing accuracy at synchronous altitudes. The spacecraft, when deployed, is separated into two substantially equal or identical halves 10 and 12 that are held apart by a spring hoop 18 and are aligned along the principle axis by the tension in cables 22 and 30 that interconnect the two spacecraft halves 10 and 12. The cables 22 and 30 and the spacecraft halves 10 and 12 are aligned by known gravity gradient principles to a primary, that in this particular example is the earth. As previously described, the gravity gradient system of satellite stabilization is accomplished by tip weights having the designated dumbbell configuration. In such dumbbell configurations and other known gravity gradient configurations, the means of interconnecting the tip weights or dumbbell elements are subject to thermal distortion or distortion because of other causes in space that tend to direct the antenna 36 on the lower satellite element 12 at an error angle toward the primary or the earth. This is very disadvantageous and it is desirable to achieve as high a pointing accuracy as possible toward the primary or earth at synchronous altitudes. Thus in this embodiment, the hoop device 18 exerts radially outward force against the satellite halves 10 and 12 and exerts tension in cables 22 and 30.

Figure 1:
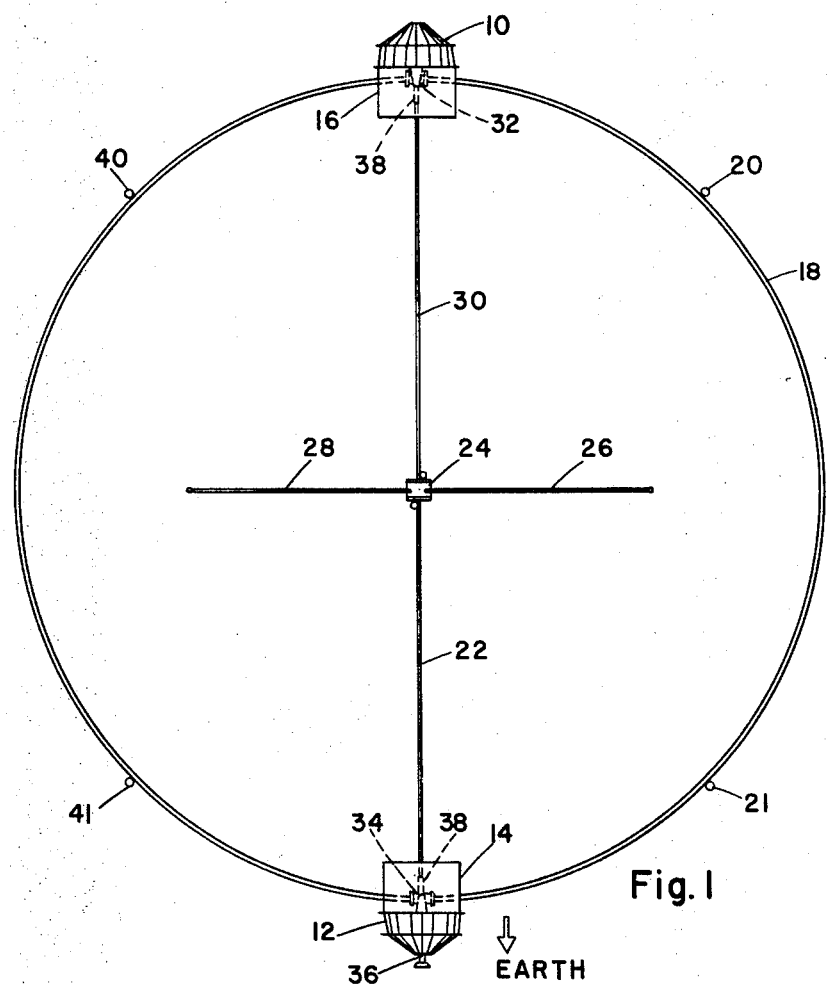
FIG. 1 is a view of the fully deployed satellite vehicle using the hoop structure.

The interconnecting cables 22 and 30 are connected to the satellite halves respectively through gimbals 32 and 34 that provides rotational freedom to the antenna halves 10 and 12 about two axis that are othogonal to the line joining the halves, or the cable 22 and 30. The cable ends are connected through rods 38 to the antenna halves, causing the antenna halves 10 and 12 to align with the tension cables 22 and 30. The tension cables 22 and 30 are held in linear arrangement against the forces of termal distortion and other space distortions causing the antenna 30 on the satellite half 12 to be directed with high pointing accuracy toward the primary or the earth. A centered housing 24 interconnects the cables 22 and 30 and also supports known damping bars or stabilizing booms, as for example booms 26 and 28, that are mounted on flexing pivots or the like to dampen out perturbing forces that can cause roll or pitch to the deployed satellite system.

Figure 3:
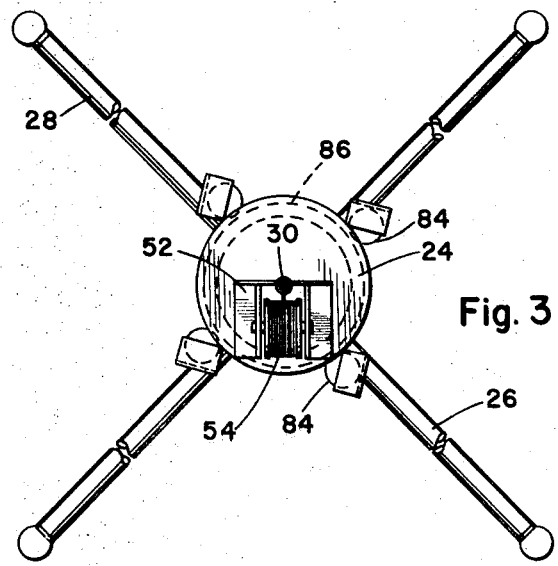
FIG. 3 is a sectional view taken on line 3-3 of FIG. 2, showing the stabilizing booms partially deployed.
Figure 2:
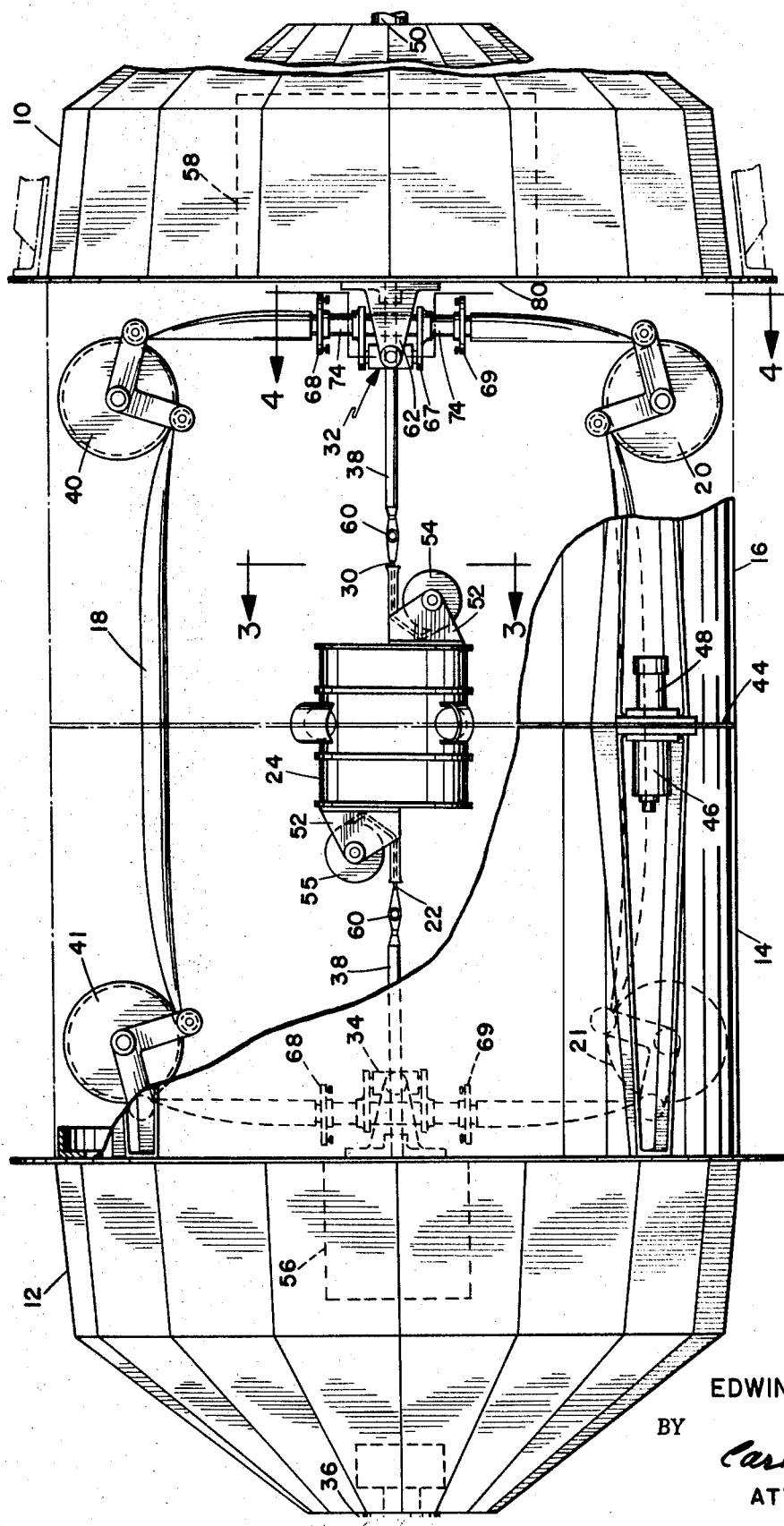
FIG. 2 is an enlarged side elevation view, partially cut away, of the collapsed satellite structure in launch condition.

Referring now to FIGS. 1, 2, 3, 4 and 5, the satellite having parts 10 and 12 is carried to a particular space orbit by known space boosters and is then projected away from the space booster by a suitable connection 50 having a known pyrotechnic disengaging system. The two halves of the satellite 10 and 12 are joined at a center connection 44 by known separation nuts 46 that are released in the known manner, such as by radio controls or other known systems, that activate explosive nuts that sheer upon command and have bolt catchers 48 for preventing contamination of the space around the satellite. Positioned in each respective end of the satellite halves are electronic equipments 56 for operating the antenna 36 and batteries 58 in the satellite half 10. Mounted within the skirts or sides 14 and 16 of the satellite structure is a centered housing 24 having reels 54 and 55 that are held in position by support means 52. The reels carry the respective tensioning cables 22 and 30 that are connected by suitable known connectors 60 to rigid tubes 38. The reels 54 and 55, see FIG. 3, may unwind through expansive forces as will be described in more detail hereinafter, or may be self-energized drums for cable storage that will unwind the reel upon separation of the satellite elements, should this be necessary. Damper stabilizing booms 26 and 28 are positioned in the housing 24 and in the illustrative embodiment employ vertistat type damper units employing rolled up flattened tubes 86 that unreel into extending cylindrical tubes around bar members 84. The damper stabilizing booms 26 and 28 are capable of free pivoting movement in planes tangent to and perpendicular to the orbit and employ known structures for providing this flexing movement such, for example, as is described in U.S. Pat. No. 3,168,263. However, it should be recognized that any known damping unit may be employed in this invention.

The hoop structure 18 of this embodiment comprises a flattened tube that is rolled up and stored on self-energizing stowage drums 40, 41 and 20 in tape configuration when the satellite is in the nonseparated condition. The semicircular ends of the hoop tube 18 are secured to flanges 68 and 69, for example, that in turn are connected by connecting tubes 74 to the side links 67 of a U-joint type gimbal 32 that provides rotational freedom of the respective satellite half about two axes orthogonal to the line joining the satellite halves. The rigid tubes 38 pass through an opening 76 in the gimbal structure 32 where the end is fastened directly to the bulkhead 80 of the respective satellite half. The pivoting portion 62 of the gimbal structure 32 is also directly connected to the bulkhead 80 in any suitable manner. Normally the electrical connection between the satellite halves is through the cables 22 and 30. However additional different currents may be carried through the hoop structure 18, by employing an insulation disc 70 in flange 68.

The sides 14 and 16 of the antenna halves have aligned openings 43 therein, see FIG. 5, that are parallel with the positioning of the hoop tape storage reels 40 and 41 and the interconnecting length of the hoop tube 18. This allows for outward expansion and movement of the hoop tube 18 upon separation of the satellite halves 10 and 12.

In operation of the embodiment of FIGS. 1, 2, 3, 4 and 5, the satellite when in the correct orbit, is separated by the explosive nut and bolt devices 46 and 48. This separation of the satellite halves along lines 44 allows expansion of the reeled tape from the respective reels 20, 40 and 41. As is well known, the flattened tube or tape has sufficient energy stored in its rolled-up condition that it provides self-energizing force for unwinding from the respective stowage drums and becomes, in the extended condition, a tube with a slit along the length thereof that exerts outward hoop spring force. This spring force, forces the satellite halves 10 and 12 apart and unreels the tension cable 22 and 30 from the reel units 54 and 55. The cable links 22 and 30 in the extended condition, hold the satellites 10 and 12 from further expansion at a given predetermined point, as a result of the spring force of the hoop 18. Thus the hoop force 18 is exerted against the gimbal links 67 that is in turn exerted through link 62 to the antenna half 10, for example. The cable unit 30 exerts force on connecting tube 38 that pulls against the bulkhead 80. This forces alignment of the satellite halves 10 and 12 through tension force of the interconnecting tension cables with each other and with the cables. The cables or cable 22 and 30 are sufficiently taut that they are able to resist deformation or curvature caused by solar thermal causes or the like. Thus by known gravity gradient principles, the two satellite halves and the tensioning cable become aligned with the principle or the earth in vertical orientation thereto, with the antenna unit 36 directed to the primary or the earth. The satellite element or half 12 and the antenna unit 36 have a high pointing accuracy at synchronous altitudes.

While the deployable hoop illustrated in this embodiment is a precurved vertistat type split tube that has particular advantage in this invention, it should be recognized that the deployable hoop can also be a wire screen split tube, an inflatable toroid member, a foam plastic rigidized toroid, a photolyzing toroid, or other known structures that are capable of expansion and orientation in the manner previously described.

Referring now to FIG. 6, there is illustrated another embodiment of this invention wherein satellite halves 100 and 102 are oriented in tip weight or dumbbell configuration and are interconnected by a tensioning cable or cables 110 and 111 through gimbal structures 113 in the manner previously described. The interconnecting housing 104 provides for unreeling and stowage of cables 110 and 111 and provides for stabilizing booms 106 in the manner previously described relative to FIGS. 1 through 5. In this particular embodiment, an expandable truss structure 112 expands tension on the satellite halves 100 and 102 and thus creates tension in cables 110 and 111. The ends of the truss member 112 are secured to the gimbal U-joint member as previously described relative to the expanding hoop 18 to provide pivoting orientation of the satellite halves 100 and 102 as previously described relative to FIG. 1. The truss structure 112 may comprise any known expansible truss structure that expands in the configuration illustrated from the retracted position in the satellite structure.

Having described my invention, I now claim:

1. A gravity gradient satellite orientation system comprising,
    a pair of bodies for being positioned in space,
    line means for connecting said bodies together when separated in space,
    resilient biasing means for biasing said bodies in opposite directions and for holding said line means taut,
    and positioning means responsive to said line means and said biasing means for positioning said bodies in axial alignment with said line means and with each other.

2. A gravity gradient satellite orientation system as claimed in claim 1 including,
    damper means for being positioned midway the length of said line means.

3. A gravity gradient satellite orientation system as claimed in claim 2 in which,
    said line means comprises a flexible cable.

4. A gravity gradient satellite orientation system as claimed in claim 3 in which,
    said positioning means includes joint means connecting said bodies to said biasing means for allowing pivotal movement of said bodies relative to said biasing means,
    and connector means for connecting the ends of said cable directly to said bodies.

5. A gravity gradient satellite orientation system as claimed in claim 4 in which, said joint means comprises a gimbal joint at each of said bodies, and said cable passes through each of said gimbals without contact therewith.

6. A gravity gradient satellite orientation system as claimed in claim 5 including, a tension rod at each end of said cable for directly connecting the ends of said cable to said bodies.

7. A gravity gradient satellite orientation system as claimed in claim 4 in which, each of said bodies comprising substantially one half of a satellite.

8. A gravity gradient satellite orientation system as claimed in claim 7 including, means for conducting electrical current between said satellite halves through said cable, and an antenna positioned on one of said satellite halves on the side opposite said cable connection.

9. A gravity gradient satellite orientation system as claimed in claim 1 including, means for connecting said satellite halves together, and means for releasing said connecting means, whereby said resilient biasing means moves said satellite halves in said opposite directions.

10. A gravity gradient satellite orientation system as claimed in claim 1 in which, said resilient biasing means comprises a hoop that is expansible radially outward.

11. A gravity gradient satellite orientation system as claimed in claim 10 including, means for holding said hoop in a retracted compact unit and releasing said hoop in expansion radially outward upon command.

12. A gravity gradient satellite orientation system as claimed in claim 10 in which, said hoop comprises a tube, and reel means for storing said tube in a flat, rolled condition.

13. A gravity gradient satellite orientation system as claimed in claim 12 in which, said positioning means includes joint means connected between the ends of semicircular halves of said hoop for allowing pivotal movement of said bodies relative to said hoop, and said line means comprises a flexible cable that interconnects said bodies and is tensioned by the expansion of said hoop.

14. A gravity gradient satellite orientation system as claimed in claim 13 in which, said resilient biasing means comprises an expansible truss structure.

15. A gravity gradient satellite orientation system as claimed in claim 14 in which, said positioning means includes joint means connected between the ends of said truss structure for allowing pivotal movement of said bodies, and said line means comprises a flexible cable that interconnects said bodies and is tensioned by the expansion of said hoop.